US011249168B2

(12) United States Patent
Wirola et al.

(10) Patent No.: US 11,249,168 B2
(45) Date of Patent: Feb. 15, 2022

(54) MULTIPLE TIMING ADVANCE MEASUREMENTS FOR POSITIONING

(71) Applicant: HERE Global B.V., Eindhoven (NL)

(72) Inventors: Lauri Aarne Johannes Wirola, Tampere (FI); Petri Rauhala, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/782,183

(22) Filed: Feb. 5, 2020

(65) Prior Publication Data
US 2020/0249311 A1 Aug. 6, 2020

(30) Foreign Application Priority Data
Feb. 5, 2019 (EP) .................................... 19155460

(51) Int. Cl.
G01S 5/02 (2010.01)
H04W 4/70 (2018.01)
G01S 5/06 (2006.01)
G01S 13/87 (2006.01)
H04W 4/02 (2018.01)
H04W 36/08 (2009.01)

(52) U.S. Cl.
CPC .............. *G01S 5/0273* (2013.01); *G01S 5/06* (2013.01); *G01S 13/878* (2013.01); *H04W 4/02* (2013.01); *H04W 4/70* (2018.02); *H04W 36/08* (2013.01)

(58) Field of Classification Search
CPC .... G01S 13/878; G01S 5/0036; G01S 5/0205; G01S 5/0273; G01S 5/06; G01S 5/14; H04W 36/08; H04W 4/02; H04W 4/70; H04W 56/0045; H04W 64/006; H04W 88/08
See application file for complete search history.

(56) References Cited

U.S. PATENT DOCUMENTS 6,987,979 B2 * 1/2006 Carlsson ............... H04W 64/00
455/456.1
9,107,041 B2 8/2015 Da
9,648,573 B2 5/2017 Siomina et al.
(Continued)

FOREIGN PATENT DOCUMENTS

WO WO 2001/65879 A1 9/2001
WO WO 2017/185948 A1 11/2017

OTHER PUBLICATIONS

Positioning Enhancements for GERAN—Introducing Timing Advance Trilateration, 3GPP TSG RAN#72, Ericsson (Jun. 2016) 7 pages.
(Continued)

*Primary Examiner* — Erica Navar
(74) *Attorney, Agent, or Firm* — Alston & Bird LLP

(57) ABSTRACT

A method and apparatus are provided for obtaining and using multiple timing advance measurements for positioning purposes. A first timing advance measurement is obtained. The first timing advance measurement is indicative of a measurement based on one or more signals of a first serving cell. A second timing advance measurement is also obtained. The second timing advance measurement is indicative of a measurement based on one or more signals of a second serving cell. A location estimate is determined based at least partially on the first timing advance measurement and the second timing advance measurement.

19 Claims, 5 Drawing Sheets

(56) References Cited

U.S. PATENT DOCUMENTS

| | | | |
|---|---|---|---|
| 2012/0295623 A1* | 11/2012 | Siomina | G01S 5/0263 |
| | | | 455/436 |
| 2015/0045061 A1 | 2/2015 | Da | |
| 2015/0189610 A1* | 7/2015 | Siomina | H04L 5/14 |
| | | | 370/280 |
| 2018/0091286 A1 | 3/2018 | Prechner et al. | |
| 2018/0324552 A1 | 11/2018 | Kumar et al. | |

OTHER PUBLICATIONS

Roth, J. D. et al., *Maximum Likelihood Geolocation in LTE Cellular Networks Using the Timing Advance Parameter*, IEEE Conference (Dec. 2016) 10 pages.

Zakaria, Y. et al., *Performance Evaluation of UE Location Techniques in LIE Networks*, American Journal of Applied. Sciences. 14 (1) (2017) 81-89.

Extended European Search Report for Application No. 19155460.9 dated Aug. 1, 2019, 10 pages.

\* cited by examiner

MULTIPLE TIMING ADVANCE MEASUREMENTS FOR POSITIONING

CROSS-REFERENCE TO RELATED APPLICATIONS

This application claims priority to European Application No. 19155460.9, filed Feb. 5, 2019, the entire contents of which are incorporated herein by reference.

FIELD

The following disclosure relates to the field of positioning techniques, or more particularly relates to systems, apparatuses, and methods for obtaining and using multiple timing advance measurements for positioning purposes.

BACKGROUND

The number of devices with location capabilities is expected to grow exponentially in the next decade. This growth is the result of the IoT (Internet-of-Things), in which more and more devices get connected to the Internet. Soon homes, factories, cities and transportation means will be equipped with low-cost sensors that produce real-time information on various characteristics and environment variables. Moreover, the cheaper electronics enable factories and industries to equip assets and supply chains with trackers that provide real-time information e.g. on the flow of goods.

The basis of the IoT applications is that the sensors and trackers are location-aware. The location-awareness can be achieved through two means: either the device has its own positioning capabilities (like GNSS (Global Navigation Satellite System) or Cellular/WiFi/BT (Bluetooth) offline positioning) or the device makes measurements of the radio environment (Cellular/WiFi/BT), e.g. and sends them to a cloud for position determination.

When it comes to small devices that must function autonomously for extended periods of time, power consumption is of special concern. The devices are powered by batteries and, thus, any means to reduce current drain are welcome. As far as location technologies are concerned, there are few ways to reduce power consumption. The greatest power saving results from using the correct positioning technology at the correct time.

For IoT trackers another aspect to consider is the connectivity power consumption. While there are connectivity networks that have especially been designed for IoT devices (NB (Narrow Band)-IoT, SigFox), lots of trackers also use basic GSM (Global System for Mobile Communications). GSM is cheap, field-tested, low-power and a low-bandwidth connectivity method.

In IoT trackers, one possible ultra-low power positioning technique is a cellular-based method, wherein such a cellular-based method can come in a variety of ways, but the relevant ones for the IoT trackers are coverage area-based methods.

Such coverage area-based methods are robust, but inaccurate (accuracy from hundreds of meters to kilometers), which is disadvantageous.

SUMMARY OF SOME EXEMPLARY EMBODIMENTS

However, there is a need for providing a more accurate positioning technique, which is power consumption aware, e.g. for IoT devices.

It is thus, inter alia, the technical objective problem to provide a solution for optimizing the accuracy of coverage-area based positioning techniques, which are at least low power consuming.

According to a first exemplary aspect of the present invention, a method is disclosed, the method comprising:
  obtaining a first timing advance measurement, wherein the first timing advance measurement is indicative of a measurement based on one or more signals of a first serving cell;
  obtaining a second timing advance measurement, wherein the second timing advance measurement is indicative of a measurement based on one or more signals of a second serving cell,
  wherein a respective timing advance measurement represents or comprises a value corresponding to a first length of time at least one signal takes to be transmitted from an electronic device to a base station of the respective serving cell plus a second length of time at least one signal to be transmitted from the base station of the respective serving cell to the electronic device; and
  determining a location estimate based at least partially on the first timing advance measurement and the second timing advance measurement.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by a base station, e.g. a BTS (Base Transceiver Station; base station of a 2G (e.g. GSM) cellular communication network), eNB (Evolved Node B; base station of a 4g (e.g. LTE (Long Term Evolution)) cellular communication network) or gNB (base station of a 5G, NR (New Radio) cellular communication network). For instance, the method may be performed and/or controlled by using at least one processor of the apparatus, e.g. the server, the server cloud, or the base station.

According to a further exemplary aspect of the invention, a computer program is disclosed, the computer program when executed by a processor causing an apparatus, for instance a server, a server cloud, or a base station, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud, or a base station. The disclosed apparatus according to any aspect of the invention may comprise only the disclosed components, for instance means, processor, memory, or may further comprise one or more additional components.

According to a second exemplary aspect of the present invention, a method is disclosed, the method comprising:
gathering a first timing advance measurement, wherein the first timing advance measurement is gathered based on a measurement of one or more signals of a first serving cell; and
gathering a second timing advance measurement, wherein the second timing advance measurement is gathered based on a measurement of one or more signals of a second serving cell,
wherein a respective timing advance measurement represents or comprises a value corresponding to a first length of time at least one signal takes to be transmitted from the at least one electronic device to a base station of the respective serving cell plus a second length of time at least one signal to be transmitted from the base station of the respective serving cell to the at least one electronic device; and the method further comprises:
outputting the first timing advance measurement and the second timing advance measurement, and/or
determining a location estimate based at least partially on the first timing advance measurement and the second timing advance measurement.

This method may for instance be performed and/or controlled by an apparatus, for instance an electronic device, e.g. a mobile terminal or an IoT-device. For instance, the method may be performed and/or controlled by using at least one processor of the electronic device.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the invention, a system is disclosed, comprising: an apparatus according to the first exemplary aspect of the invention as disclosed above, and an electronic device according to the second exemplary aspect as disclosed above, wherein the apparatus is configured to obtain (e.g. receive) a first and a second timing advance measurement from the electronic device, and the electronic device is configured to receive, as a result of sending the first and the second timing advance measurement, a location estimate from the apparatus.

In the following, exemplary features and exemplary embodiments of all aspects of the present invention will be described in further detail.

The method according to the first and/or second exemplary aspect of the present invention proposes to improve location estimates, e.g. which are determined based on the coverage area-based approach as aforementioned, by utilizing e.g. two or more timing advance measurements. For instance, a location estimate as a result of a coverage-based positioning method can be further specified, e.g. by limiting the possible area. Thus, the location estimate is determined, at least partially, on the obtained or gathered first and second timing advance measurements. In this way, a more accurate location estimate is achieved.

Timing Advance (TA), or timing advance measurement, i.e. the round-trip time measurement between a base station and an electronic device, is available for the device for example in GSM, LTE (Longterm Evolution), LTE Cat-M1 and NB-IoT networks, where the last two are LPWAN (Low Power Wide Area Network) network technologies designed for narrow band devices (note: in some other networks, including UTRA (UMTS Terrestrial Radio Access), such TA measurements are available in the network side only).

The first timing advance measurement may for instance be obtained by receiving the first timing advance measurement. The first timing advance measurement may for instance be obtained by retrieving the first timing advance measurement, e.g. from a memory comprised by or connectable to the at least one apparatus performing and/or controlling the method according to the first exemplary aspect of the present invention. In case the at least one apparatus performing and/or controlling the method according to the first exemplary aspect of the present invention is a server, or a base station of a cellular network, the first timing advance measurement may for instance be received from a certain electronic device. The certain electronic device may for instance provide (e.g. send) the first timing advance measurement to the at least one apparatus. Alternatively, the certain electronic device may for instance send the first timing advance measurement to an entity that is different from the at least one apparatus, wherein this entity may for instance then relay the first timing advance measurement to the at least one apparatus. In the same kind of way, the second timing advance measurement may for instance be obtained by a corresponding receiving of the second timing advance measurement. Further, the electronic device may for instance be configured to perform and/or control the method according to the second exemplary aspect of the present invention. Thus, the electronic device may for instance gather the first timing advance measurement, e.g. by measuring the first timing advance measurement. In the same kind of way, the second timing advance measurement may for instance be gathered by a corresponding measuring of the second timing advance measurement. Then, the electronic device performing and/or controlling the method according to the second exemplary aspect of the present invention may for instance output (e.g. sent) the first and second timing advance measurement to the at least one apparatus (e.g. the server, server cloud, or base station) performing and/or controlling the method according to the first exemplary aspect of the present invention, and/or determine a location estimate at least partially based on the gathered first and second timing advance measurement. In case the first and second timing advance measurement were output (e.g. sent), e.g. to the at least one apparatus (e.g. the server, server cloud, or base station) performing and/or controlling the method according to the first exemplary aspect of the present invention, this at least one apparatus may for instance determine the location estimate at least partially based on the first and second timing advance measurement (which were previously gathered by the electronic device).

The electronic device may for instance be portable (e.g. weigh less than 5, 4, 3, 2, or 1 kg). The electronic device may for instance comprise or be connectable to a display for displaying information, e.g. a route that is guided/navigated to a user, to name but one non-limiting example. The electronic device may for instance comprise or be connectable to means for outputting sound, e.g. in the form of spoken commands or information. The electronic device may for instance comprise or be connectable to one or more sensors for determining the devices position, such as for instance a GNSS receiver, in the form of a GPS receiver. The electronic device may for instance comprise or be connectable to one or more sensors, e.g. in the form of an accelerometer and/or a gyroscope for gathering (e.g. measuring) further information. The electronic device may for instance comprise or be connectable to a receiver and/or a transmitter (e.g. a transceiver) for receiving and/or sending information. For instance, the electronic device may comprise one or more radio receivers (e.g. radio transceivers, e.g. cellular radio transceivers) to gather one or more respective timing advance measurements, which may for instance enable the method according to the first and/or second exemplary aspects of the present invention to be performed and/or controlled. The electronic device may for instance be suitable for outdoor and/or indoor navigation respectively positioning.

The first and second serving cell may for instance be enabled by a first and second base station. Such a base station may for instance be a part (e.g. entity) of a cellular communication network. The second serving cell may for instance be different from the first serving cell. In example embodiments however, a further timing advance measurement may for instance be obtained from the same serving cell (e.g. at least two timing advance measurements from the first or from the second serving cell, to name but a few non-limiting examples). Those at least two (e.g. further) timing advance measurements may for instance be utilized for determining whether or not an electronic device that gathered (e.g. measured) the at least two further timing advance measurements from the same serving cell is stationary or at least moving only in a limited (e.g. geographic) area.

A respective measurement to gather a respective timing advance measurement may for instance be performed and/or controlled by an electronic device (e.g. the electronic device according to the second exemplary aspect of the present invention). Such a measurement may for instance be based, at least partially, on one or more signals of the serving cell, e.g. a base station of a cellular communication network currently providing cellular communication service(s) to the respective electronic device. A respective measurement may for instance be gathered (e.g. measured) based on at least one signal and the length of time it takes for the at least one signal to be transmitted from a respective electronic device to a respective base station of the current serving cell plus a second length of time at least one signal to be transmitted from the base station of the respective serving cell to the at least one electronic device Such base stations as used by example embodiments of the present invention are also referred to as BTS, eNB, or gNB (Next Generation NodeB), to name but a few non-limiting examples.

A respective timing advance measurement may for instance be gathered (e.g. measured) by the electronic device based on one or more signals of a single serving cell, e.g. a base station of the serving cell. Further, a respective timing advance measurement may for instance be gathered (e.g. measured) by the electronic device at a time, e.g. as specified by a connectivity respectively communication network standard that is used by the communication connection between the electronic device and the serving cell (e.g. a base station of the communication network providing communication services).

The location estimate is determined based at least partially on the first timing advance measurement and the second timing advance measurement. In particular, the first timing advance measurement and the second timing advance measurement may for instance be utilized to correct another location estimate, e.g. a coarse location estimate, that was determined based on another positioning technique, such as Cell ID based positioning, to name but one non-limiting example.

In this way, in general, it is proposed a solution to overcome the limitation that only a single timing advance measurement is available at a time. This is enabled by the method of the first and/or the second exemplary aspect of the present invention by obtaining (e.g. receiving) and/or gathering (e.g. collecting, or measuring) multiple (e.g. at least two) timing advance measurements, e.g. over a period of time. Such timing advance measurements are then utilized to determine a (e.g. more accurate) location estimate than another location estimate that is determined prior to the obtaining or gathering of the first and the second timing advance measurements, e.g. based solely on a coverage area-based positioning method. For instance, after determining a location estimate based on a coverage area-based positioning method, the first and second timing advance measurements are used to specify the location estimate to acquire a more accurate location estimate.

Example embodiments according to all aspects of the present invention enable to implement the method according to the first and/or second exemplary aspects of the present invention into one or more communication standards, so that e.g. nothing new is expected from (a) connectivity network(s) that is utilized to perform and/or control the example embodiments. In this way, backward compatibility is ensured.

According to an exemplary embodiment of the first exemplary aspect of the present invention, one or more further timing advance measurements are obtained that are respectively indicative of respective measurements based on one or more signals of one or more further serving cells.

The one or more further timing advance measurements may for instance be obtained by receiving the one or more further timing advance measurements, e.g. from the electronic device. This electronic device may for instance be the same electronic device from which the first and/or second timing advance measurements stem. Thus, by obtaining the first, second, and optionally further timing advance measurements, multiple (e.g. at least two) timing advance measurements are obtained (e.g. received). It will be understood that prior to the obtaining of the respective timing advance measurements by the at least one apparatus performing and/or controlling the method according to the first exemplary aspect of the present invention, the respective timing advance measurements may for instance be gathered (e.g. measured, or collected) by the electronic device, e.g. over a period of time. By gathering the respective timing advance measurements over the period of time, the electronic device is given the time e.g. needed to change the current serving cell based on which a respective timing advance measurement is gathered. For instance, the electronic device may change its current serving cell since e.g. another base station of another serving cell provides better quality signal to be received by the electronic device, to name but one non-limiting example. Then, another respective timing advance measurement can be gathered.

The one or more further timing advance measurements may for instance be obtained by the at least one apparatus performing and/or controlling the method according to the first exemplary aspect of the present invention, and/or gathered by the at least one electronic device performing and/or controlling the method according to the second exemplary aspect of the present invention after an intentionally triggered serving cell change has taken place, or by waiting for the serving cell to change spontaneously so that the one or more further timing advance measurements can be obtained, to name but a few non-limiting examples.

The one or more further timing advance measurements may for instance be obtained by the at least one apparatus performing and/or controlling the method according to the first exemplary aspect of the present invention, and/or gathered by the at least one electronic device performing and/or controlling the method according to the second exemplary aspect of the present invention in case the electronic device has not moved significantly, thus it can be considered to be stationary or moving only in a limited (e.g. geographic) area.

It will be understood that the location estimate may for instance be determined further based at least partially, on the one or more further timing advance measurements.

According to an exemplary embodiment of the first exemplary aspect of the present invention, to obtain the second timing advance measurement and/or the further timing advance measurements, the electronic device determines to change (e.g. a spontaneous change), or is triggered to change a current serving cell to a new serving cell, and the second timing advance measurement and/or the further timing advance measurements are based on one or more signals of the respective serving cell to which the electronic device has changed.

According to an exemplary embodiment of all aspects of the present invention, for instance, the electronic device determines to change a current serving cell to a new serving cell, in case the electronic device itself triggers a change of the current serving cell to a new serving cell. This may for instance comprise that the electronic device comprises e.g. logic on-board which may for instance cause the electronic device to disconnect from the current serving cell and then reconnect to another, thus the new, serving cell.

The current serving cell may for instance be provided by a base station providing communication service(s) to the respective electronic device. The current serving cell may for instance be the first or second serving cell. In case the current serving cell is the first serving cell, e.g. the electronic device may for instance be triggered to change to a new serving cell. This new serving cell may for instance be the second serving cell, in case of the aforementioned example. In case the current serving cell is e.g. the second serving cell, the electronic device may for instance be triggered to change to a new serving cell, e.g. a further serving cell to perform such a change of its serving cell.

In this way, the respective timing advance measurements (e.g. at least the first and the second timing advance measurements) are gathered of two or more serving cells by the electronic device.

According to an exemplary embodiment of the first exemplary aspect of the present invention, to obtain the second timing advance measurement and/or the further timing advance measurements, the second timing advance measurement and/or the further timing advance measurements are respectively obtained by receiving the second timing advance measurement and/or the further timing advance measurements after a change of the current serving cell to the new serving cell has taken place.

After the change of the serving cell from the current serving cell to the new serving cell has taken place, the electronic device may for instance gather (e.g. measure) the second timing advance measurement (in case the current serving cell was the first serving cell and the new serving cell is the second serving cell), or gather (e.g. measure) a further timing advance measurement (in case the current serving cell was e.g. the second serving cell or another serving cell that is different from the first and the second serving cell). The respective timing advance measurement that is gathered after a change of the serving cell has taken place is gathered e.g. based on one or more signals of the new serving cell. It will be understood that the electronic device may for instance output the respective further timing advance measurement after it has gathered the respective further timing advance measurement, e.g. to the at least one apparatus performing and/or controlling the method according to the first exemplary aspect of the present invention.

According to an exemplary embodiment of the first exemplary aspect of the present invention, the electronic device is triggered to change the serving cell by sending a respective trigger information indicative of a control command to change the serving cell to the respective electronic device.

According to an exemplary embodiment of the second exemplary aspect of the present invention, the method further comprises:
changing or triggering the change of the current serving cell to a new serving cell.

The electronic device may for instance not need to receive any control command, e.g. in the form of a trigger information (see below). The changing or triggering of the change may for instance be performed and/or controlled, e.g. by a time-based trigger, to name but one non-limiting examples.

According to an exemplary embodiment of the second exemplary aspect of the present invention, the method further comprises:
receiving trigger information indicative of a control command to change a current serving cell (e.g. first or second serving cell); and
changing or triggering the change of the current serving cell to a new serving cell based at least partially on the trigger information.

In contrast to performing and/or controlling of the step of changing or triggering the change of the current serving cell to a new serving cell, only, alternatively, e.g. a trigger information may for instance be received, e.g. from the outside (e.g. from the at least one apparatus performing and/or controlling the method according to the first exemplary aspect of the present invention).

The following details with respect to the trigger information equally apply to example embodiments of the first and the second exemplary aspect of the present invention.

The trigger information may for instance be transmitted from the at least one apparatus to the electronic device. The trigger information may for instance be relayed or transmitted from a respective base station of the (current) serving cell of the electronic device to the electronic device.

In order to change the (current) serving cell to another (new) serving cell, low level access to a cellular modem of the electronic device may for instance be required. Then, the trigger information after being received by the electronic device triggers the electronic device to perform and/or control a change of serving cell. The trigger information represents or comprises e.g. a control command forcing a respective cellular modem of the electronic device to change the serving cell. For instance, in some communication network types, the trigger information may for instance require the cellular modem of the electronic device to act against the corresponding communication standard, or at least against certain rules as specified by the corresponding communication standard. To exemplify, the forced change of serving cell may for instance first require reporting less-than-observed signal power(s) of one or more signals of the (current) serving cell, e.g. to a respective network controller, so that based on the low signal power a change of serving cell takes place, to name but one non-limiting example. This may require e.g. faking less-than-observed signal power(s) to enforce the change of serving cell, to name but one non-limiting example.

Additionally or alternatively, the electronic device may for instance change the (current) serving cell to another (new) serving cell at least partially based on requirements of the communication standard that is utilized by the electronic device. For instance, the electronic device may disconnect from the current serving cell, and then may reconnect to another (new) serving cell. This change of serving cell may for instance be performed and/or controlled by the electronic device, since e.g. the connection quality to the current serving cell may be low. In such cases, a connection to another serving cell may for instance provide a better connection quality than the one of the current serving cell.

Additionally or alternatively, the electronic device may for instance change the (current) serving cell to another (new) serving cell, e.g. by disconnecting from the (current) serving cell and connecting to the other (new) serving cell, to be enabled to gather a 'new' timing advance measurement (e.g. the second timing advance measurement in case the first timing advance measurement was already gathered, and/or a further timing advance measurement in case e.g. the second timing advance measurement was already gathered, to name but a few non-limiting examples).

According to an exemplary embodiment of all exemplary aspects of the present invention, the respective method further comprises:
determining if the electronic device is stationary or only moving in a limited area by comparing two or more respective timing advance measurements (e.g. that may for instance be subsequently obtained), wherein the comparing comprises determining whether or not the electronic device is in an area of a distance as a resolution of a pre-defined or according to pre-determined rules timing that is specified by a communication standard being utilized (e.g. by the electronic device).

If the location of the electronic device whose location is to be estimated can be assumed to be (relatively) stationary—stationary or moving in a limited (e.g. geographic area only —, in order to gather (by the electronic device according to the second exemplary aspect of the present invention) or to obtain (by the at least one apparatus according to the first exemplary aspect of the present invention) at least two respective timing advance measurements, it may for instance be simply waited for a serving cell change to take place.

Additionally, different timing advance measurements (e.g. represented by corresponding TA values) from multiple (e.g. at least two) base stations that are currently not serving cells may for instance be gathered (e.g. measured, or observed) only after a serving cell change has taken place. Thus, a respective timing advance measurement may for instance only be gathered for the serving cell that is currently a serving cell for the electronic device. In order to gather (second exemplary aspect) the one or more further timing advance measurements, it may for instance be waited that a serving cell change is performed by the electronic device, e.g. without it being triggered.

This works because there may always be some natural fluctuation in the observable signal powers and, thus, the base station of the serving cell typically may for instance change after a certain period of time due to a reduced signal power of the (current) serving cell. This kind of change of the serving cell may for instance take place even if the electronic device is (totally) static, thus, not moving at all. Additionally or alternatively, there may be also other reasons for a serving cell change. For instance, the current serving cell may become (e.g. too) crowded e.g. due to many other electronic devices getting connected to it and, thus, consuming its payload transmission capacity, or due to be enabled to gather e.g. the second timing advance measurement and/or one or more further timing advance measurements, to name but a few non-limiting examples. Hence, the cellular network may for instance decide to force this particular electronic device to change (e.g. switch) to another serving cell (e.g. to balance the load over different cells).

This behavior is further enhanced, if the device moves in a relatively small area, which will necessarily cause signal levels to fluctuate enhancing the probability for a serving cell change.

The term "stationary" and the term "only moving in a limited area" as used herein refer to a movement of the electronic device in the context of its location within a coverage area as provided by the communication network utilized by the electronic device. For instance, a timing advance value as represented or comprised by the respective timing advance measurement may for instance be resolved into a distance, e.g. in the unit of meters to name but one non-limiting example. It will be understood that the respective timing advance measurement may for instance alternatively represent or comprise the respective distance, so that a resolution into the distance is not necessary on part of the at least one apparatus of the method according to the first exemplary aspect of the present invention.

According to an exemplary embodiment of all exemplary aspects of the present invention, the electronic device is considered to be stationary or be moving in a limited area in case the electronic device is in an area of a distance as a resolution of a pre-defined timing that is based on a communication standard being utilized. The pre-defined timing may for instance be a certain threshold value. Alternatively, the timing may for instance be defined according to pre-determined rules, so that e.g. the absolute value of the timing may for instance change according to the pre-determined rules.

For instance, in communication networks according to the GSM communication standard, a respective distance as represented or comprised by a respective timing advance measurement(s) is of the resolution of e.g. approximately 550 meters. Thus, in the context of a coverage area as provided by communication networks according to the GSM standard, the terms "stationary" or "only moving in a limited area" is to understood that the electronic device moves while gathering the respective timing advance measurements, say 550 m/2, thus approximately 250 meters only (e.g. in a circular area of 125 m radius), e.g. measured from the location at which e.g. the first timing advance measurement was gathered. The limited area in which the electronic device can move to be still considered to be "stationary" may for instance be a circular area. The circular area may for instance be of the diameter of 250 meters, with respect to the aforementioned example in the context of GSM communication network(s).

To name another non-limiting example, in the communication networks according to the LTE communication standard, the distance as represented by the respective timing advance measurement(s) is of the resolution of approximately 78 meters. Thus, the terms "stationary" or "only moving in a limited area" means, say, 78 m/2, approximately 40 meters for an allowed movement of the electronic device to be considered to be stationary or only moving in a limited area (e.g. a circular area with the radius of around 20 meters). It will be understood that the requirement of the electronic device to be considered to be stationary or only moving in a limited area is optional. For instance, even if the electronic device moves during the gathering of the respective timing advance measurements e.g. twice the mentioned distances (e.g. 550 m for GSM communication network(s), 78 m for LTE communication network(s) or more), positioning accuracy still improves significantly compared to methods where only one serving cell and the related timing advance measurement is utilized for determining a respective location estimate.

According to an exemplary embodiment of the second exemplary aspect of the present invention, the first timing advance measurement and the second timing advance measurement, and optionally the further timing advance measurements are gathered over an extended period of time, wherein in case the first timing advance measurement and the second timing advance measurement, and optionally the further timing advance measurements are gathered over the extended period of time, two or more respective timing advance measurements can be gathered for the same serving cell.

However, it will be understood that in case two or more respective timing advance measurements are gathered for the same serving cell, at least one other respective timing advance measurement is gathered for another serving cell. In this way, it is enabled that the location estimate is determined at least partially based on at least two respective timing advance measurements, wherein the at least two respective timing advance measurements are gathered based on at least two different serving cells.

According to an exemplary embodiment of all exemplary aspects of the present invention, in order to determine whether or not an electronic device is stationary or only moving in a limited area, a list of observed neighbor cells of the current serving cell of the electronic device may for instance be analyzed. For instance, in case the list does not change (at least not significantly), it may for instance be assumed that there hasn't been significant movement of the electronic device. Thus, the electronic device may for instance be determined to be stationary or only moving in a limited area. It will be understood that one or more further dimensions may for instance be incorporated into this analysis, e.g. the neighbor cell(s) signal strength(s) can be used in the analysis, too.

In this way, it is enabled to determine (e.g. detect) the case in which the electronic device is considered to be stationary or only moving in a limited area.

For instance, when the respective timing advance measurements are being obtained from multiple cells over an extended period by the at least one apparatus performing and/or controlling the method according to the first exemplary aspect of the present invention, and additionally, when at least two respective timing advance measurements are obtained from the same cell at different times, those at least two obtained timing advance measurements representing or comprising respective values may for instance be compared. If the values represented or comprised by the respective timing advance measurements are the same, it may for instance be deduced that there hasn't been significant motion, thus the electronic device is considered to be stationary or only moving in a limited area. Additionally or alternatively, the serving cell signal strength may for instance be utilized for this purpose.

According to an exemplary embodiment of the second exemplary aspect of the present invention, one or more sensors comprised by or connectable to the electronic device enabling to detect a motion of the electronic device are utilized to determine whether or not the electronic device is stationary or only moving in a limited area.

In order to determine (e.g. detect) whether or not the electronic device is stationary or only moving in a limited area, alternatively or additionally, one or more sensors comprised by or connectable to the electronic device enabling to detect a motion of the electronic device may for instance be utilized. For instance, information gathered by those one or more sensors may for instance be indicative of a movement of the electronic device. Thus, it may be derivable, even based on the information as gathered by the one or more sensors alone, whether or not the electronic device is stationary or only moving in a limited area.

It will be understood that in case the one or more sensors of the electronic device gather respective information, this may for instance increase power consumption of the electronic device.

According to an exemplary embodiment of all exemplary aspects of the present invention, in case a first timing advance value comprised by or represented by the first timing advance measurement and a second timing advance value comprised by or represented by the second timing advance measurement, and optionally a further timing advance value comprised by or represented by the further timing advance measurements has not changed, or has changed, but is within a pre-defined threshold value, the electronic device is considered to be stationary or be only moving in a limited area.

For instance, the electronic device may gather one or more further timing advance measurements. Some of those one or more further timing advance measurements may for instance be gathered based on one or more signals of cells, from which a respective timing advance measurement was already gathered. In case those two timing advance measurements were taken at different times, it may for instance be determined whether or not the electronic device is stationary or only moving in a limited area since a respective timing advance value comprised by or represented by each of the respective timing advance measurements may have not changed, or may have changed only within a pre-defined threshold value respectively range. In case e.g. the pre-defined threshold value respectively range is exceeded, it may for instance be assumed that the electronic device has obviously moved significantly.

According to an exemplary embodiment of the first exemplary aspect of the present invention, the location estimate is determined based at least partially on a mapping of the obtained timing advance measurements to a distance between the electronic device and the base station of the first serving cell.

Once multiple (e.g. at least two) timing advance measurements $TA_i$ have been obtained, and the respective base station locations $x_i^{bs}$ are known (or for example estimated), the location $x^{ue}$ of the electronic device can be solved from the following non-linear system of equations:

$$\|x^{ue} - x_i^{bs}\| = d(TA_i) + e,$$

where $d(TA_i)$ maps the respective timing advance measurement to the distance between the base station and the electronic device. To exemplify, e.g. in GSM, TA=1 is equivalent to round-trip-time of one GSM bit of length 3.69 µs, i.e. 1100 meters, resulting in 550 meters of distance. The term e refers to the measurement noise, which is a function of the TA resolution (e.g. in GSM networks use e~N(0, $160^2$), where 160 m is the standard deviation of the uniformly distributed probability density in range [0, 550 m], which is the distance resolution of one TA step.

It will be understood that the solution may further be enhanced, e.g. by using coverage areas as extra measurements or as linear constraints in the minimization.

According to an exemplary embodiment of the first exemplary aspect of the present invention, a respective round-trip time represented by the respective timing advance measurements enables the determining of the distance, as described above.

According to an exemplary embodiment of the first exemplary aspect of the present invention, the method further comprises:

outputting the determined location estimate.

After the location estimate is determined, it may for instance be output, e.g. to the electronic device performing and/or controlling the method according to the second exemplary aspect of the present invention, or to another apparatus that is different which may for instance relay the determined location estimate to the electronic device. The location estimate may for instance be output by transmitting the location estimate, e.g. via a communication interface.

After the electronic device performing and/or controlling the method according to the second exemplary aspect of the present invention has gathered the first timing advance measurement, the first timing advance measurement may for instance be output, e.g. to the at least one apparatus performing and/or controlling the method according to the first exemplary aspect of the present invention. The same equally applies to the second timing advance measurement.

According to an exemplary embodiment of the second exemplary aspect of the present invention, the first and the second timing advance measurements are output together.

The first and the second timing advance measurements may for instance be output sequentially, or in parallel. In the latter case, the first and the second timing advance measurement may for instance be output together. The first and the second timing advance measurement may for instance be output via a communication interface, e.g. a cellular modem comprised by or connectable to the electronic device.

According to an exemplary embodiment of all exemplary aspects of the present invention, the second timing advance measurement is gathered in case a change from the first serving cell to the second serving cell has taken place.

The change may for instance take place due to a received trigger information. Alternatively or additionally, the change may for instance take place due to low signal strengths (power) that is observable from the (current) serving cell. The change may for instance be performed and/or controlled in order to get the serving cell proving a better signal strength to the electronic device.

According to an exemplary embodiment of the second exemplary aspect of the present invention, in case a change of serving cell has taken place, the method further comprises:

gathering one or more further timing advance measurements that are based on one or more signals of one or more serving cells, wherein the one or more further timing advance measurements are respectively gathered based on respective measurements of one or more signals from serving cells that are different to each other, and/or are respectively gathered over an extended period of time; and outputting the one or more further timing advance measurements, and/or determining the location estimate further based on the one or more further timing advance measurements.

It will be understood that in case the electronic device has gathered the first and the second timing advance measurements, one or more further timing advance measurements may for instance be gathered, e.g. after a further change of the (current) serving cell to another (new) serving cell has taken place.

Further, one or more further timing advance measurements may for instance be gathered after a certain (e.g. pre-defined) time interval has elapsed, even if no change of the serving cell has taken place. Then, one or more further timing advance measurements may for instance be gathered over an extended period of time (e.g. multiple of such (e.g. pre-defined) time intervals have elapsed, to name but one non-limiting example). One or more further timing advance measurements gathered based on one or more signals of (the) same cell(s) may for instance be utilized in order to determine (e.g. detect) whether or not the electronic device is stationary or only moving in a limited area, as already described in this specification. It will be understood that these features described with respect to determine if the electronic device is stationary equally applies to the method according to the second exemplary aspect of the present invention.

According to an exemplary embodiment of the second exemplary aspect of the present invention, the method further comprises:

receiving a location estimate indicative of a current location of the at least one electronic device.

For instance, in case the gathered first and second timing advance measurements are output, the location estimate may for instance be received in response.

After the location estimate is determined by the at least one apparatus performing and/or controlling the method of the first exemplary aspect of the present invention, it may for instance be output, e.g. to the electronic device performing and/or controlling the method according to the second exemplary aspect of the present invention, or to another apparatus that is different which may for instance relay the determined location estimate to the electronic device. Then, the location estimate is received by the electronic device.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
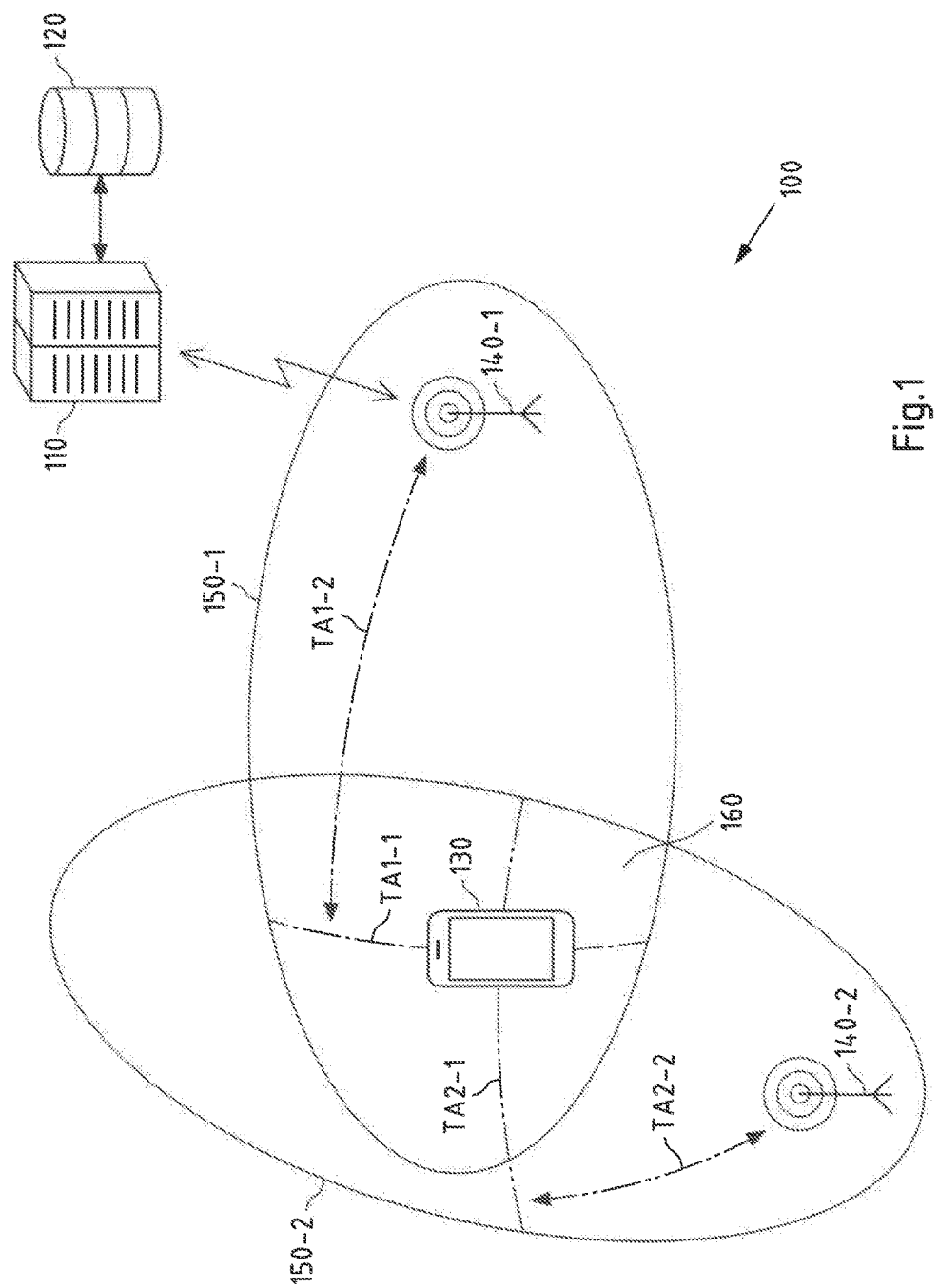
FIG. 1 is a schematic block diagram of a system according to the third exemplary aspect of the present invention.

FIG. 1 is a schematic high-level block diagram of a system 100 according to an exemplary aspect of the present invention. Such a system 100 may for instance represent a generic system architecture which may for instance be utilized by example embodiments of the present invention.

System 100 comprises an electronic device 130, a server 110, an optional database 120, and two radio nodes 140, which are embodied as base stations 140-1, 140-2 in the illustrated example embodiment.

The electronic device 130 may for instance be embodied as a mobile device, e.g. a smartphone, tablet, portable navigation device, IoT (Internet-of-Things) device, to name but a few non-limiting examples.

The server 110 may for instance be embodied as a server cloud (e.g. a plurality of servers connected, e.g. via the Internet and providing one or more services at least partially jointly). Such a server may alternatively be comprised by a base station 140-1, 140-2. The server 110 may for instance be connected, e.g. via a communication network (e.g. cellular communication network) employed by the base stations 140-1, 140-2, to the electronic device 130, to the optional database 120, and/or to at least one of the base stations 140-1, 140-2.

The database 120 may for instance be comprised by or connectable to the server 110. The database 120 may for instance comprise a memory, e.g. for storing one or more first, second, and/or further timing advance measurements, one or more location estimates, or the like, to name but a few non-limiting examples.

The server 110, and/or at least one of the base stations 140-1, 140-2 may for instance be configured to perform and/or control the first method according to the first exemplary aspect of the present invention. The electronic device may for instance be configured to perform and/or control the second method according to the second exemplary aspect of the present invention.

Each of the base stations 140-1, 140-2 employs a respective cell, in which coverage areas 150-1, 150-2 services may for instance be provided. In order to determine a location estimate indicative of a current location of the electronic device 130, the respective coverage areas 150-1, 150-2 may for instance be utilized. In this case the location estimate can be determined to represent the area 160, which is the intersection of the two coverage areas 150-1, 150-2. According to example embodiments of the present invention, to determine a location estimate indicative of a current location of the electronic device 130, further, a first timing advance measurement is gathered by the electronic device 130, which is indicative of a round-trip time measurement between the electronic device 130 and the base station 140-1. Such a measurement is illustrated in FIG. 1 with the reference numeral TA1-2. The circular arc marked with the reference numeral TA1-1 indicates a distance, which can be determined based on the first timing advance measurement TA1-2.

Further, according to example embodiments of the present invention, a second timing advance measurement is gathered by the electronic device 130, which is indicative of a round-trip time measurement between the electronic device 130 and the base station 140-2. Such a measurement is illustrated in FIG. 1 with the reference numeral TA2-2. The circular arc marked with the reference numeral TA2-1 indicates a distance, which can be determined based on the second timing advance measurement TA2-2.

It will be understood that the first and the second timing advance measurements are obtained, e.g. by server 110, and/or by at least one of the base stations 140-1, 140-2 prior to determining the location estimate. Then, the first and second timing advance measurements are utilized for determining the location estimate. Additionally or alternatively, the electronic device 130 may for instance receive or download information about the locations (or location estimates) of the base stations 140-1 and 140-2. The locations (or location estimates) of the base stations 140-1 and 140-2 may for instance be determined (e.g. estimated) at least partially based on crowd-sourced data, which may for instance have been gathered separately, to name but one non-limiting example. Then, electronic device 130 may for instance utilize this information together with the gathered first and second timing advance measurements it has carried out, to determine the location estimate. It can then optionally transmit the location estimate to other apparatuses.

As is represented in FIG. 1 by the two circular arcs TA1-2, TA2-2, the first and second timing advance measurements are gathered based on a respective round-trip-time between electronic device 130 and the respective base stations 140-1, 140-2. The accuracy of the location estimate can be significantly improved as is indicated by the arcs TA1-1, TA2-1, which are the round-trip-time measurements as represented by the arcs TA1-2, TA2-2 resolved into a respective distance that the electronic device 130 is positioned away from the respective base station 140-1, 140-2. The crossing point of the arcs TA1-1, TA2-1 corresponds to the location that is estimated of the electronic device 130, as determined according to example embodiments of the present information. In contrast, the location estimate of the electronic device 130 would only represent the entire area 160 to be the location of the electronic device 130 in case the location estimate is not determined based at least partially on the first and second timing advance measurement, instead of the crossing point of the arcs TA1-1 and TA2-1.

Figure 2A:
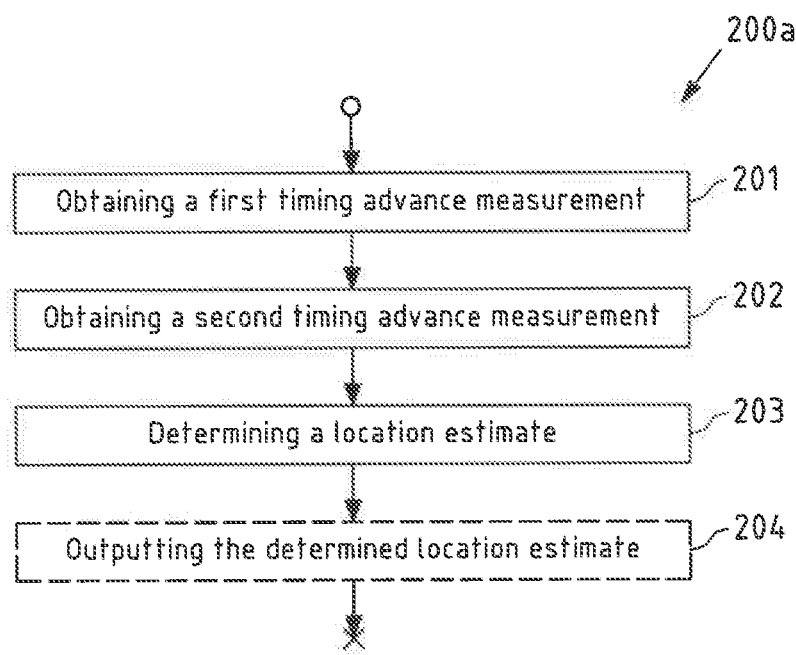
FIG. 2*a-c* are flowcharts showing example embodiments of a first method according to the first exemplary aspect of the present invention, for instance performed by server 110 of FIG. 1.

FIG. 2*a* is a flowchart 200*a* showing an example embodiment of a method according to the first exemplary aspect of the present invention. This flowchart 200*a* may for instance be performed by a server (e.g. server 110 of FIG. 1), and/or a base station (e.g. at least one of the base stations 140-1, 140-2, respectively employing cells which may for instance provide services to an electronic device, e.g. electronic device 130).

In a first step 201, a first timing advance measurement is obtained. The first timing advance measurement is obtained, e.g. by receiving the first timing advance measurement from an electronic device (e.g. electronic device 130 of FIG. 1).

In a second step 202, a second timing advance measurement is obtained. The second timing advance measurement is obtained, e.g. by receiving the second timing advance measurement from an electronic device (e.g. electronic device 130 of FIG. 1).

In a third step 203, a location estimate is determined based at least partially on the first timing advance measurement and the second timing advance measurement.

In an optional fourth step 204, the location estimate is output, e.g. to an electronic device from which in step 201, 202 the respective timing advance measurements are obtained.

Figure 2B:
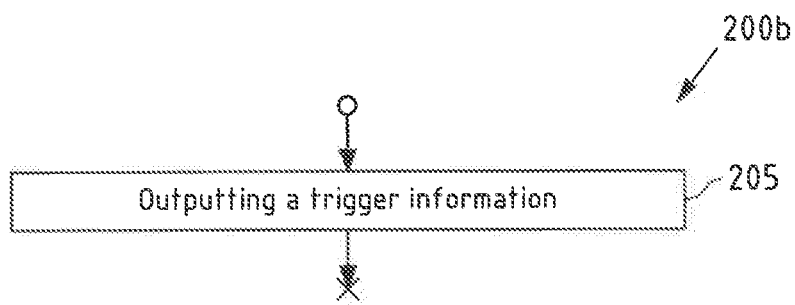

FIG. 2*b* is a flowchart 200*b* showing an example embodiment of a method according to the first exemplary aspect of the present invention. This flowchart 200*b* may for instance be performed by a server (e.g. server 110 of FIG. 1), and/or a base station (e.g. at least one of the base stations 140-1, 140-2, respectively employing cells which may for instance provide services to an electronic device, e.g. electronic device 130). This flowchart 200*b* may for instance be performed and/or controlled in addition to the flowchart 200*a* of FIG. 2*a*. This flowchart 200*b* may for instance be performed and/or controlled anytime during the performing and/or controlling of the flowchart 200*a* of FIG. 2*a*, e.g. in parallel to any one of the steps 201 to 204, or in between, prior or subsequent to any one of the steps 201 to 204.

In a step 205, a trigger information indicative of triggering an electronic device (e.g. electronic device 130 of FIG. 1) to perform and/or control a change from a current serving cell (e.g. serving cell employed by base station 140-1 of FIG. 1) to a new serving cell (e.g. the cell employed by base station 140-2 of FIG. 1) is output (e.g. transmitted), e.g. to an electronic device (e.g. electronic device 130 of FIG. 1).

Figure 2C:
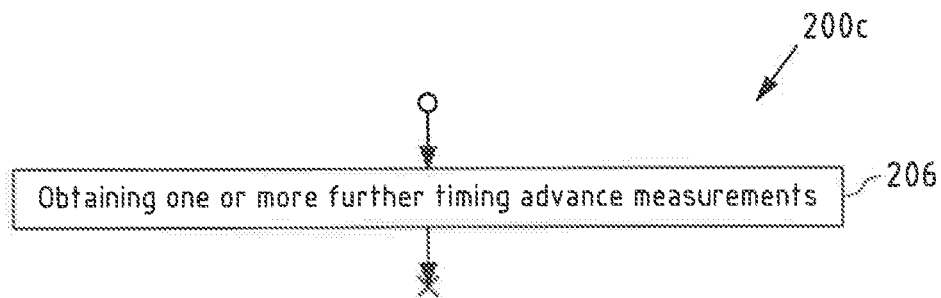

FIG. 2*c* is a flowchart 200*c* showing an example embodiment of a method according to the first exemplary aspect of the present invention. This flowchart 200*c* may for instance be performed by a server (e.g. server 110 of FIG. 1), and/or a base station (e.g. at least one of the base stations 140-1, 140-2, respectively employing cells which may for instance provide services to an electronic device, e.g. electronic device 130). This flowchart 200*c* may for instance be performed and/or controlled in addition to the flowchart 200*a* of FIG. 2*a*, and/or further, in addition to the flowchart 200*b* of FIG. 2*b* as well. This flowchart 200*c* may for instance be performed and/or controlled anytime during the performing and/or controlling of the flowchart 200*a* of FIG. 2*a*, and/or flowchart 200*b* of FIG. 2*b*, e.g. in parallel to any one of the steps 201 to 205, or in between, prior or subsequent to any one of the steps 201 to 205.

In a step 206, one or more further timing advance measurements are obtained. The one or more further timing advance measurements are obtained, e.g. by receiving the one or more further timing advance measurements from an electronic device (e.g. electronic device 130 of FIG. 1). It will be understood that the one or more further timing advance measurements may for instance be utilized to determine the location estimate (see step 203 of FIG. 2*a*).

Figure 3A:
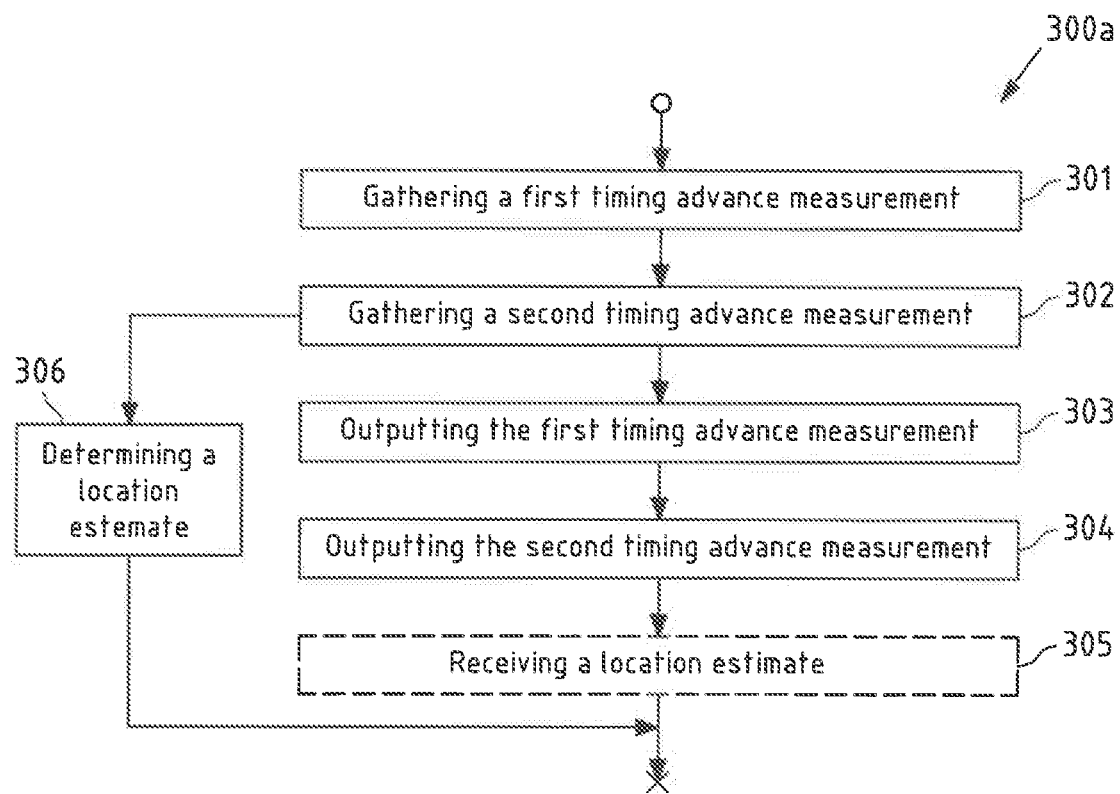
FIG. 3*a-c* are flowcharts showing example embodiments of a second method according to the second exemplary aspect of the present invention, for instance performed by electronic device 130 of FIG. 1.

FIG. 3*a* is a flowchart 300*a* showing an example embodiment of a method according to the second exemplary aspect of the present invention. This flowchart 300*a* may for instance be performed by an electronic device (e.g. electronic device 130 of FIG. 1).

In a first step 301, a first timing advance measurement is gathered (e.g. measured). The first timing advance measurement is gathered e.g. by one or more sensors (e.g. sensors 570 and/or by the communication interface(s) 550 of apparatus 500 in case apparatus 500 represents the electronic device) of the electronic device enabling e.g. measuring a round-trip time between the electronic device and a base station employing a serving cell (e.g. one of the base stations 140-1, 140-2 of FIG. 1). Such a timing advance measurement may for instance require to transmit a corresponding information, e.g. via a communication interface of the electronic device (e.g. communication interface 550 of apparatus 500 in case apparatus 500 represents the electronic device).

In a second step 302, a second timing advance measurement is gathered (e.g. measured). The second timing advance measurement is gathered e.g. by one or more sensors (e.g. sensors 570 and/or by the communication interface(s) 550 of apparatus 500 in case apparatus 500 represents the electronic device) of the electronic device enabling e.g. measuring a round-trip time between the electronic device and a base station employing a (current) serving cell (e.g. one of the base stations 140-1, 140-2 of FIG. 1). Such a timing advance measurement may for instance require to transmit a corresponding information, e.g. via a communication interface of the electronic device (e.g. communication interface 550 of apparatus 500 in case apparatus 500 represents the electronic device). To gather the second timing advance measurement, a change of serving cell from a serving cell based on which signals the first timing advance measurement was gathered (see step 301) to a new serving cell (e.g. the other one of the base stations 140-1, 140-2 of FIG. 1).

In a third step 303, the first timing advance measurement is output, e.g. to a server (e.g. server 110 of FIG. 1), and/or to a base station (e.g. one of the base stations 140-1, 140-2 of FIG. 1) which are configured to perform and/or control flowchart 200*a* of FIG. 2*a*.

In a fourth step 304, the second timing advance measurement is output, e.g. to a server (e.g. server 110 of FIG. 1), and/or to a base station (e.g. one of the base stations 140-1, 140-2 of FIG. 1) which are configured to perform and/or control flowchart 200*a* of FIG. 2*a*.

In an optional fifth step 305, a location estimate is received. Such a location estimate may for instance be received as a result of outputting the first and the second timing advance measurements in steps 303 and 304. Such a location estimate may for instance stem from a server and/or a base station to which the first and the second timing advance measurements were output.

Alternatively to outputting the first timing advance measurement (see step 303) and the second timing advance measurement (see step 304), the electronic device may for instance determine a location estimate in step 306. The location estimate may for instance be determined at least partially based on the first timing advance measurement gathered in step 301, and the second timing advance measurement gathered in step 302. Additionally or alternatively, prior to the determining of the location estimate, the electronic device may for instance receive or download information about the locations (or location estimates) of the base stations 140-1 and 140-2. Then, electronic device 130 may for instance utilize this information together with the gathered first and second timing advance measurements it has carried out, to determine the location estimate.

Figure 3B:
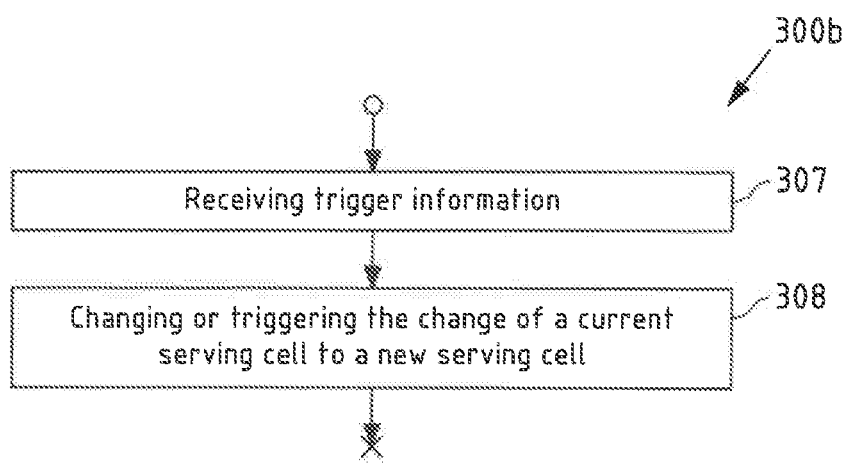

FIG. 3*b* is a flowchart 300*b* showing an example embodiment of a method according to the second exemplary aspect of the present invention. This flowchart 300*b* may for instance be performed by an electronic device (e.g. electronic device 130 of FIG. 1). This flowchart 300*b* may for instance be performed and/or controlled in addition to the flowchart 300*a* of FIG. 3*a*. This flowchart 300*b* may for instance be performed and/or controlled anytime during the performing and/or controlling of the flowchart 300*a* of FIG. 3*a*, e.g. in parallel to any one of the steps 301 to 306, or in between, prior or subsequent to any one of the steps 301 to 306.

In a first step 307, a trigger information indicative of triggering the electronic device to perform and/or control a change from a current serving cell (e.g. serving cell employed by base station 140-1 of FIG. 1) to a new serving cell (e.g. the cell employed by base station 140-2 of FIG. 1) is received. Further, the triggering may for instance also take place within the electronic device (e.g. electronic device 130) itself. In this case, the trigger information may for instance be received from an application that is executed by the electronic device. For example, the triggering may take place as a result of time based trigger.

In a second step 308, a change of the serving cell is performed, or triggered to be performed by the electronic device.

Figure 3C:
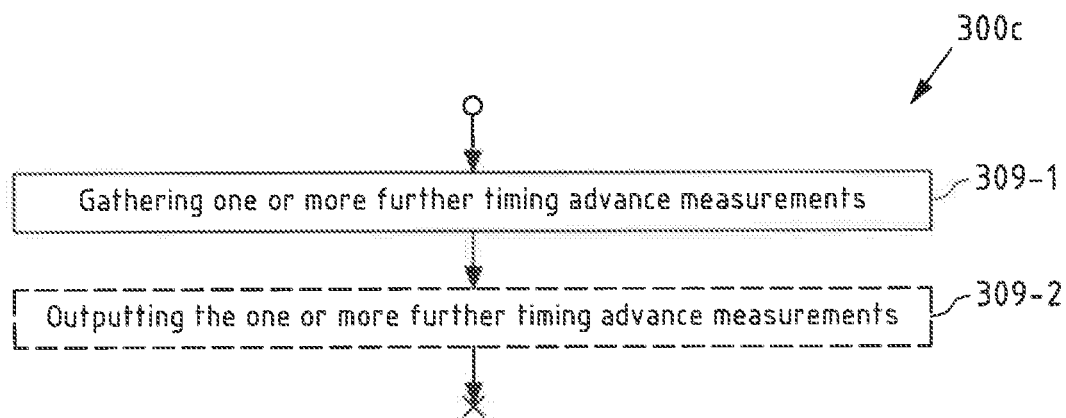

FIG. 3*c* is a flowchart 300*c* showing an example embodiment of a method according to the second exemplary aspect of the present invention. This flowchart 200*c* may for instance be performed by an electronic device (e.g. electronic device 130 of FIG. 1). This flowchart 300*c* may for instance be performed and/or controlled in addition to the flowchart 300*a* of FIG. 3*a*, and/or further, in addition to the flowchart 300*b* of FIG. 3*b* as well. This flowchart 300*c* may for instance be performed and/or controlled anytime during the performing and/or controlling of the flowchart 300*a* of FIG. 3*a*, and/or flowchart 300*b* of FIG. 3*b*, e.g. in parallel to any one of the steps 301 to 308, or in between, prior or subsequent to any one of the steps 301 to 308.

In a first step 309-1, one or more further timing advance measurements are gathered (e.g. measured). The one or more further timing advance measurements are gathered e.g. by one or more sensors (e.g. sensors 570 of apparatus 500 in case apparatus 500 represents the electronic device) of the electronic device enabling e.g. measuring a round-trip time between the electronic device and a base station employing a serving cell (e.g. one of the base stations 140-1, 140-2 of FIG. 1). Such a timing advance measurement may for instance require to transmit a corresponding information, e.g. via a communication interface of the electronic device (e.g. communication interface 550 of apparatus 500 in case apparatus 500 represents the electronic device). For instance, each of the one or more further timing advance measurements may be gathered (e.g. measured) based on a respective new serving cell, thus being employed by one or more base stations, which are different to each other.

In a second step 309-2, the one or more further timing advance measurements are output, e.g. to a server (e.g. server 110 of FIG. 1), and/or to a base station (e.g. one of the base stations 140-1, 140-2 of FIG. 1) which are configured to perform and/or control flowchart 200*a* of FIG. 2*a*.

Figure 4:
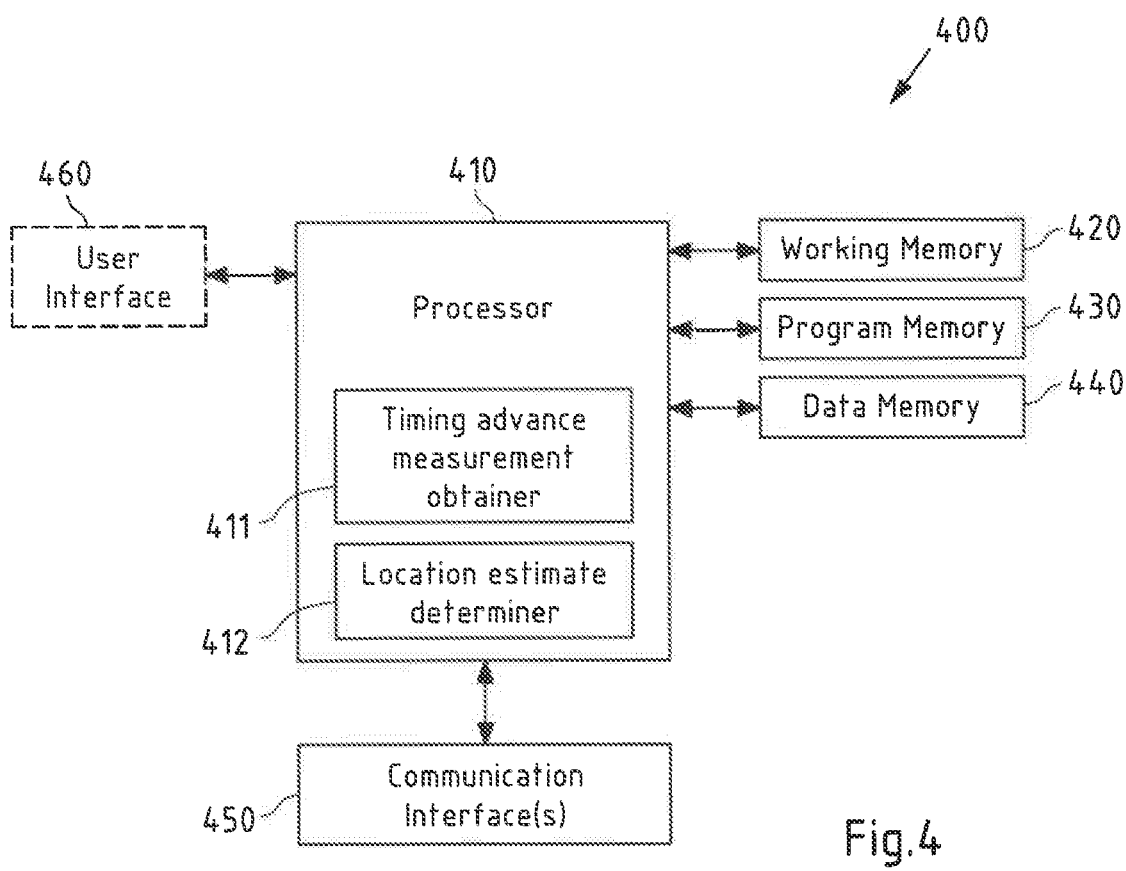
FIG. 4 is a schematic block diagram of a first apparatus configured to perform the first method according to the first exemplary aspect of the present invention.

FIG. 4 is a schematic block diagram of an apparatus 400 according to an exemplary aspect of the present invention, which may for instance represent the server 110, one of the radio nodes 140, e.g. embodied as respective base stations 140-1, 140-2 of FIG. 1, and which may for instance be configured to perform and/or control flowchart 200*a* of FIG. 2*a*. Apparatus 400 may for instance further be configured to perform and/or control flowchart 200*b* of FIG. 2*b* and/or flowchart 200*c* of FIG. 2*c* in addition to flowchart 200*a* of FIG. 2*a*.

Apparatus 400 comprises a processor 410, working memory 420, program memory 430, data memory 440, communication interface(s) 450, and an optional user interface 460.

Apparatus 400 may for instance be configured to perform and/or control or comprise respective means (at least one of 410 to 460) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention.

Processor 410 may for instance comprise a timing advance measurement obtainer 411 as a functional and/or structural unit. Timing advance measurement obtainer 411 may for instance be configured to obtain a first timing advance measurement (see step 201 of FIG. 2*a*), a second timing advance measurement (see step 202 of FIG. 2*a*), one or more further timing advance measurements (see step 206 of FIG. 2*c*), or a combination thereof.

Processor 410 may for instance comprise a location estimate determiner 412 as a functional and/or structural unit. Location estimate determiner 412 may for instance be configured to determine a location estimate (see step 203 of FIG. 2*a*).

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 450 enable apparatus 400 to communicate with other entities, e.g. with electronic device 130 of FIG. 1. The communication interface(s) 450 may for instance comprise a wireless interface, e.g. a cellular radio communication interface and/or a WLAN interface and/or a BT- or BLE interface), for instance to communicate with entities via the Internet. Communication interface(s) may enable apparatus 400 to communicate with other entities, for instance with electronic device 130 of FIG. 1.

User interface 460 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

Figure 5:
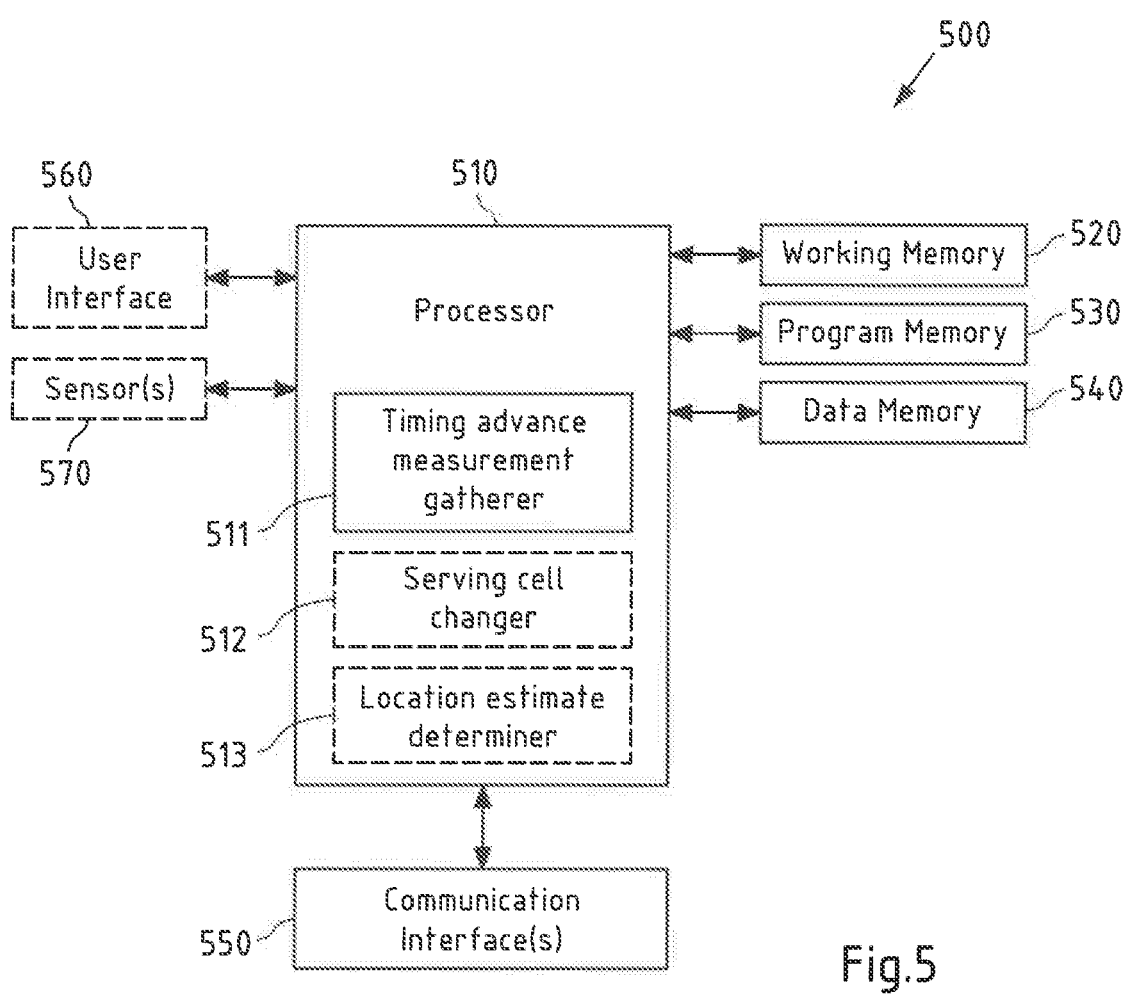
FIG. 5 is a schematic block diagram of a second apparatus configured to perform the second method according to the second exemplary aspect of the present invention.

FIG. 5 is a schematic block diagram of an apparatus 500 according to an exemplary aspect of the present invention, which may for instance represent the electronic device 130 of FIG. 1, and which may for instance be configured to perform and/or control flowchart 300*a* of FIG. 3*a*. Apparatus 500 may for instance further be configured to perform and/or control flowchart 300*b* of FIG. 3*b* and/or flowchart 300*c* of FIG. 3*c* in addition to flowchart 300*a* of FIG. 3*a*.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the second exemplary aspect. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspect of the invention.

Processor 510 may for instance comprise a timing advance measurement gatherer 511 as a functional and/or structural unit. Timing advance measurement gatherer 511 may for instance be configured to gather (e.g. measure) a first timing advance measurement (see step 301 of FIG. 3*a*), a second timing advance measurement (see step 303 of FIG. 3*a*), one or more further timing advance measurements (see step 309-1 of FIG. 3*c*), or a combination thereof.

Processor 510 may for instance comprise an optional serving cell changer 512 as a functional and/or structural unit. Serving cell changer 512 may for instance be configured to change a serving cell, or to trigger a change of a serving cell (see step 308 of FIG. 3*b*).

Processor 510 may for instance comprise an optional location estimate determiner 513 as a functional and/or structural unit. Location estimate determiner 513 may for instance be configured to determine a location estimate (see step 306 of FIG. 3*a*).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the second exemplary aspect.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 550 enable apparatus 500 to communicate with other entities, e.g. with server 110 and/or radio nodes 140 of FIG. 1. The communication interface(s) 550 may for instance comprise a wireless interface, e.g. a cellular radio communication interface and/or a WLAN interface and/or a BT- or BLE interface) and/or wire-bound interface, e.g. an IP-based interface, for instance to communicate with entities via the Internet. Communication interface(s) may enable apparatus 500 to communicate with other entities, for instance with server 110 and/radio node 140 of FIG. 1.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a GNSS (Global Navigation Satellite System), e.g. GPS (Global Positioning System), sensor, e.g. to gather a location information indicative of a location estimate determined based on signals of one or more satellites, and/or accelerometer to gather information indicative of a movement of the apparatus 500, to name but a few non-limiting examples.

Some or all of the components of the apparatus 500 may for instance be connected via a bus. Some or all of the components of the apparatus 500 may for instance be combined into one or more modules.

The following embodiments shall also be considered to be disclosed:

Embodiment 1

A first apparatus (e.g. a server, a server cloud, or a base station) comprising at least one processor and at least one memory including computer program code, the at least one memory and the computer program code configured to, with the at least one processor, cause the apparatus to at least perform:
  obtaining a first timing advance measurement, wherein the first timing advance measurement is indicative of a measurement based on one or more signals of a first serving cell;
  obtaining a second timing advance measurement, wherein the second timing advance measurement is indicative of a measurement based on one or more signals of a second serving cell,
  wherein a respective timing advance measurement represents or comprises a value corresponding to a first length of time at least one signal takes to be transmitted from an electronic device to a base station of the respective serving cell plus a second length of time at least one signal takes to be transmitted from the base station of the respective serving cell to the electronic device; and
  determining a location estimate based at least partially on the first timing advance measurement and the second timing advance measurement.

Embodiment 2

The apparatus according to embodiment 1, wherein one or more further timing advance measurements are obtained that are respectively indicative of respective measurements based on one or more signals of one or more further serving cells.

Embodiment 3

The apparatus according to any of the preceding embodiments, wherein to obtain the second timing advance measurement and/or the further timing advance measurements, the electronic device determines to change, or is triggered to change a current serving cell to a new serving cell, and the second timing advance measurement and/or the further timing advance measurements are based on one or more signals of the respective serving cell to which the electronic device has changed.

Embodiment 4

The apparatus according to embodiment 2 or embodiment 3, wherein to obtain the second timing advance measurement and/or the further timing advance measurements, the second timing advance measurement and/or the further timing advance measurements are respectively obtained by receiving them after a change of the current serving cell to the new serving cell has taken place.

Embodiment 5

The apparatus according to any of the preceding embodiments, wherein the electronic device is triggered to change the serving cell by sending a respective trigger information indicative of a control command to change the serving cell to the respective electronic device.

Embodiment 6

The apparatus according to any of the preceding embodiments, the at least one memory and the computer program code configured to, with the at least one processor, cause the apparatus further to perform:

determining if the electronic device is stationary or only moving in a limited area by comparing two or more respective timing advance measurements, wherein the comparing comprises determining whether or not the electronic device is in an area of a distance as a resolution of a pre-defined or defined according to pre-determined rules timing that is based on a communication standard being utilized.

Embodiment 7

The apparatus according to embodiment 6, wherein the electronic device is considered to be stationary or be moving in a limited area in case the electronic device is in an area of a distance as a resolution of a pre-defined or defined according to pre-determined rules timing that is based on a communication standard being utilized.

Embodiment 8

The apparatus according to any of the preceding embodiments, wherein the location estimate is determined based at least partially on a mapping of the obtained timing advance measurements to a distance between the electronic device and the base stations of two or more serving cells.

Embodiment 9

The apparatus according to embodiment 8, wherein a respective round-trip time represented by the respective timing advance measurements enables the determining of the distance.

Embodiment 10

The apparatus according to any of the preceding embodiments, the at least one memory and the computer program code configured to, with the at least one processor, cause the apparatus further to perform:
outputting the determined location estimate.

Embodiment 11

A second apparatus (e.g. an electronic device) comprising at least one processor and at least one memory including computer program code, the at least one memory and the computer program code configured to, with the at least one processor, cause the apparatus to at least perform:
gathering a first timing advance measurement, wherein the first timing advance measurement is gathered based on a measurement of one or more signals of a first serving cell; and
gathering a second timing advance measurement, wherein the second timing advance measurement is gathered based on a measurement of one or more signals of a second serving cell,
wherein a respective timing advance measurement represents or comprises a value corresponding to a first length of time at least one signal takes to be transmitted from the at least one electronic device to a base station of the respective serving cell plus a second length of time at least one signal takes to be transmitted from the base station of the respective serving cell to the at least one electronic device; and the at least one memory and the computer program code configured to, with the at least one processor, cause the apparatus further to perform:
outputting the first timing advance measurement and the second timing advance measurement; and/or
determining a location estimate based at least partially on the first timing advance measurement and the second timing advance measurement.

Embodiment 12

The apparatus according to embodiment 11, wherein the first and the second timing advance measurements are output together.

Embodiment 13

The apparatus according to embodiment 11 or embodiment 12, the at least one memory and the computer program code configured to, with the at least one processor, cause the apparatus further to perform:
receiving trigger information indicative of a control command to change a current serving cell; and
changing or triggering the change of the current serving cell to a new serving cell based at least partially on the trigger information.

Embodiment 14

The apparatus according to any of the embodiments 11 to 13, wherein the second timing advance measurement is gathered in case a change from the first serving cell to the second serving cell has taken place:

Embodiment 15

The apparatus according to any of the embodiments 11 to 14, the at least one memory and the computer program code configured to, with the at least one processor, cause the apparatus further to perform:
receiving a location estimate indicative of a current location of the at least one electronic device.

Embodiment 16

The apparatus according to any of the embodiments 11 to 15, the at least one memory and the computer program code configured to, with the at least one processor, cause the apparatus further to perform:
gathering one or more further timing advance measurements that are based on one or more signals of one or more serving cells, wherein the one or more further timing advance measurements are respectively gathered based on respective measurements of one or more signals from serving cells that are different to each other, and/or are respectively gathered over an extended period of time; and
outputting the one or more further timing advance measurements, and/or determining the location estimate further based on the one or more further timing advance measurements.

Embodiment 17

The apparatus according to any of the embodiments 11 to 16, wherein the first timing advance measurement and the second timing advance measurement, and optionally the further timing advance measurements are gathered over an extended period of time, wherein in case the first timing advance measurement and the second timing advance measurement, and optionally the further timing advance measurement, and optionally the further timing advance measurements are gathered over the extended period of time, two or more respective timing advance measurements can be gathered for the same serving cell.

Embodiment 18

The apparatus according to any of the embodiments 11 to 17, wherein the location estimate is determined based at least partially on a mapping of the obtained timing advance measurements to the distances between the electronic device and the base stations of two or more serving cells.

Embodiment 19

A first tangible computer-readable medium storing computer program code, the computer program code when executed by a processor causing an apparatus to perform and/or control:
  obtaining a first timing advance measurement, wherein the first timing advance measurement is indicative of a measurement based on one or more signals of a first serving cell;
  obtaining a second timing advance measurement, wherein the second timing advance measurement is indicative of a measurement based on one or more signals of a second serving cell,
  wherein a respective timing advance measurement represents or comprises a value corresponding to a first length of time at least one signal takes to be transmitted from an electronic device to a base station of the respective serving cell plus a second length of time at least one signal takes to be transmitted from the base station of the respective serving cell to the electronic device; and
  determining a location estimate based at least partially on the first timing advance measurement and the second timing advance measurement.

Embodiment 20

A second tangible computer-readable medium storing computer program code, the computer program code when executed by a processor causing an apparatus to perform and/or control:
  gathering a first timing advance measurement, wherein the first timing advance measurement is gathered based on a measurement of one or more signals of a first serving cell; and
  gathering a second timing advance measurement, wherein the second timing advance measurement is gathered based on a measurement of one or more signals of a second serving cell,
  wherein a respective timing advance measurement represents or comprises a value corresponding to a first length of time at least one signal takes to be transmitted from the at least one electronic device to a base station of the respective serving cell plus a second length of time at least one signal takes to be transmitted from the base station of the respective serving cell to the at least one electronic device; and the at least one memory and the computer program code configured to, with the at least one processor, cause the apparatus further to perform:
  outputting the first timing advance measurement and the second timing advance measurement; and/or
  determining a location estimate based at least partially on the first timing advance measurement and the second timing advance measurement.

Embodiment 21

A system, comprising:
  at least one first apparatus (e.g. a server, a server cloud, or a base station) according to any of the embodiments 1 to 10; and
  at least one second apparatus (e.g. an electronic device) according to any of the embodiments 11 to 18.

In general, it is proposed a solution that attempts to solve the problem of having only a single TA measurement available at a time by collecting multiple TA measurements over a period of time.
  Obtaining multiple TA measurements in a device, wherein TA measurement is measured with respect to a single serving cell (base station) at a time as specified by the connectivity network standards
  Further TA measurements are measured with respect to other cells
    by an intentionally triggered serving cell change, or
    by waiting for the serving cell to change spontaneously
  When the said device is stationary or moving in a limited area, and
  Using the said multiple Timing Advance measurements for improving the calculated tracker position or calculating the tracker position accurately.
Obtaining further TA measurements:
  Example embodiments according to all aspects of the present invention enable to implement respecting standards, i.e. nothing new is expected of the connectivity networks.
  If the device location can be assumed to be relatively stationary, the device can simply wait for a serving cell change and observe different TA values from multiple base stations. This works because, as an example, there is always some natural fluctuation in the signal powers and, thus, serving base station typically changes every now and then, even when staying static. This behavior is further enhanced, if the device moves in a relatively smalls area, which will necessarily cause signal levels to fluctuate enhancing the probability for a serving cell change.
  The term "relatively" in the previous chapter must be understood in the context of connectivity network. For instance, in GSM networks the TA distance resolution is approximately 550 meters. Thus, in the GSM context "relatively stationary" or "relatively small" is, say 550 m/2, thus approximately 250 meters. In the LTE networks, the TA distance resolution is 78 meters. Thus, "small" means, say, 78 m/2, approximately 40 meters. Note that even if the device moves for example twice the mentioned distances or more, positioning accuracy is expected to improve significantly compared to method where only one serving cell and the related TA is known and used in position calculation.
  Another option, requiring low level access to the cellular modem, is to force the modem to change the serving cell. This would in some network types potentially require the modem to act against the standard, or at least against the spirit of the standard. To exemplify, the forced change might first require reporting less-than-observed signal powers for the current serving cell to the network controller.
Determining (e.g. detecting) a stationary case:
  When the TA measurements are being obtained from multiple cells over an extended period, and when TA measurements from the same cell are obtained at different times, those two TA values can be compared. If same or similar, it can be deduced that there hasn't been significant motion. Moreover, the serving cell signal strength can be used for this purpose.

Yet another method is to pay attention to the list of observed neighbor cells, and if the list does not change (at least not significantly) it can be assumed that there hasn't been significant movement. Again, also the neighbor cell signal strengths can be used in the analysis too.

Note that it is obviously possible to use device on-board sensors to detect motion, but this may increase power consumption.

Positioning:

Once multiple TA measurements $TA_i$ have been obtained and the base station locations $\underline{x}_i^{bs}$ are known (or for example estimated based on some data modelling), the device location $\underline{x}^{ue}$ can be solved from the following non-linear system of equations:

$$\|\underline{x}^{ue}-\underline{x}_i^{bs}\|=d(TA_i)+e,$$

where $d(TA_i)$ maps the TA measurement to the distance between the base station and the device. To exemplify, in GSM, TA=1 is equivalent to round-trip-time of one GSM bit of length 3.69 μs, i.e. 1100 meters, resulting in 550 meters of distance. The term e refers to the measurement noise, which is a function of the TA resolution (e.g. in GSM networks use e~N(0,160²), where 160 m is the standard deviation of the uniformly distributed probability density in range [0, 550 m], which is the distance resolution of one TA step).

Note that the solution may further be enhanced by using coverage areas as extra measurements or as linear constraints in the minimization.

Example embodiments according to all aspects of the present invention enable to achieve a better accuracy in a simple way. Furthermore, the presented idea can be implemented independently from the mobile network operators, provided that the base station locations are known (with decent accuracy) based on some available information (such as crowdsourcing of radio signals of base stations). Traditionally timing based positioning methods have been based on network-centric calculations, which are possible only for mobile network operators.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, performed by at least one apparatus, comprising:
    obtaining a first timing advance measurement, wherein the first timing advance measurement is indicative of a measurement based on one or more signals of a first serving cell;
    providing trigger information comprising a control command configured to cause an electronic device to change from the first serving cell to a second serving cell by causing a cellular modem of the electronic device to report a less-than-observed signal power of the first serving cell;
    obtaining a second timing advance measurement, wherein the second timing advance measurement is indicative of a measurement based on one or more signals of the second serving cell,
    wherein a respective timing advance measurement represents or comprises a value corresponding to a first length of time at least one signal takes to be transmitted from the electronic device to a base station of the respective serving cell plus a second length of time at least one signal takes to be transmitted from the base station of the respective serving cell to the electronic device; and
    determining a location estimate based at least partially on the first timing advance measurement and the second timing advance measurement.

2. The method according to claim 1, wherein one or more further timing advance measurements are obtained that are respectively indicative of respective measurements based on one or more signals of one or more further serving cells.

3. The method according to claim 2, wherein to obtain the second timing advance measurement and/or the further timing advance measurements, the second timing advance measurement and/or the further timing advance measurements are respectively obtained by receiving them after a change of the current serving cell to the new serving cell has taken place.

4. The method according to claim 1, further comprising:
   determining if the electronic device is stationary or only moving in a limited area by comparing two or more respective timing advance measurements, wherein the comparing comprises determining whether or not the electronic device is in an area of a distance as a resolution of a pre-defined or defined according to pre-determined rules timing that is based on a communication standard being utilized.

5. The method according to claim 1, wherein the location estimate is determined based at least partially on a mapping of the obtained timing advance measurements to a distance between the electronic device and the base stations of two or more serving cells.

6. The method according to claim 5, wherein a respective round-trip time represented by the respective timing advance measurements enables the determining of the distance.

7. A method, performed by at least one electronic device, comprising:
   gathering a first timing advance measurement, wherein the first timing advance measurement is gathered based on a measurement of one or more signals of a first serving cell;
   causing the at least one electronic device to change from the first serving cell to a second serving cell by causing a cellular modem of the at least one electronic device to report a less-than-observed signal power of the first serving cell; and
   gathering a second timing advance measurement, wherein the second timing advance measurement is gathered based on a measurement of one or more signals of a second serving cell,
   wherein a respective timing advance measurement represents or comprises a value corresponding to a first length of time at least one signal takes to be transmitted from the at least one electronic device to a base station of the respective serving cell plus a second length of time at least one signal takes to be transmitted from the base station of the respective serving cell to the at least one electronic device; and wherein the method further comprising:
   outputting the first timing advance measurement and the second timing advance measurement; and/or
   determining a location estimate based at least partially on the first timing advance measurement and the second timing advance measurement.

8. The method according to claim 7, further comprising:
   receiving trigger information indicative of a control command to change a current serving cell, wherein the changing of the current serving cell to a new serving cell is based at least partially on the trigger information.

9. The method according to claim 7, wherein the second timing advance measurement is gathered in case a change from the first serving cell to the second serving cell has taken place.

10. The method according to claim 7, further comprising in case a change of serving cell has taken place:
    gathering one or more further timing advance measurements that are based on one or more signals of one or more serving cells, wherein the one or more further timing advance measurements are respectively gathered based on respective measurements of one or more signals from serving cells that are different to each other, and/or are respectively gathered over an extended period of time; and
    outputting the one or more further timing advance measurements, and/or
    determining the location estimate further based on the one or more further timing advance measurements.

11. The method according to claim 10, wherein the first timing advance measurement and the second timing advance measurement, and optionally the further timing advance measurements are gathered over an extended period of time, wherein in case the first timing advance measurement and the second timing advance measurement, and optionally the further timing advance measurements are gathered over the extended period of time, two or more respective timing advance measurements can be gathered for the same serving cell.

12. The method according to claim 7, wherein the location estimate is determined based at least partially on a mapping of the obtained timing advance measurements to the distances between the electronic device and the base stations of two or more serving cells.

13. The method according claim 7, further comprising:
    determining if the electronic device is stationary or only moving in a limited area by comparing two or more respective timing advance measurements, wherein the comparing comprises determining whether or not the electronic device is in an area of a distance as a resolution of a pre-defined or defined according to pre-determined rules timing that is based on a communication standard being utilized.

14. An apparatus comprising at least one processor and at least one memory containing computer program code, the at least one memory and the computer program code configured, with the at least one processor, to cause the apparatus at least to:
    obtain a first timing advance measurement, wherein the first timing advance measurement is indicative of a measurement based on one or more signals of a first serving cell;
    provide trigger information comprising a control command configured to cause an electronic device to change from the first serving cell to a second serving cell by causing a cellular modem of the electronic device to report a less-than-observed signal power of the first serving cell;
    obtain a second timing advance measurement, wherein the second timing advance measurement is indicative of a measurement based on one or more signals of a second serving cell,
    wherein a respective timing advance measurement represents or comprises a value corresponding to a first length of time at least one signal takes to be transmitted from the electronic device to a base station of the respective serving cell plus a second length of time at least one signal takes to be transmitted from the base station of the respective serving cell to the electronic device; and determine a location estimate based at least partially on the first timing advance measurement and the second timing advance measurement.

15. The apparatus according to claim 14, wherein one or more further timing advance measurements are obtained that are respectively indicative of respective measurements based on one or more signals of one or more further serving cells.

16. The apparatus according to claim 15, wherein to obtain the second timing advance measurement and/or the further timing advance measurements, the second timing advance measurement and/or the further timing advance measurements are respectively obtained by receiving them after a change of the current serving cell to the new serving cell has taken place.

17. The apparatus according to claim 14, wherein the at least one memory and the computer program code are further configured, with the at least one processor, to cause the apparatus at least to:

determine if the electronic device is stationary or only moving in a limited area by comparing two or more respective timing advance measurements, wherein the comparing comprises determining whether or not the electronic device is in an area of a distance as a resolution of a pre-defined or defined according to pre-determined rules timing that is based on a communication standard being utilized.

18. The apparatus according to claim 14, wherein the location estimate is determined based at least partially on a mapping of the obtained timing advance measurements to a distance between the electronic device and the base stations of two or more serving cells.

19. The apparatus according to claim 18, wherein a respective round-trip time represented by the respective timing advance measurements enables the determining of the distance.

* * * * *